United States Patent [19]

Pelkey et al.

[11] Patent Number: 5,144,842
[45] Date of Patent: Sep. 8, 1992

[54] PRESSURE TRANSDUCER PROTECTION APPARATUS

[75] Inventors: Duane A. Pelkey, Kent; Patrick J. Schirmer, Seattle, both of Wash.

[73] Assignee: The United States of America as represented by the Secretary of the Air Force, Washington, D.C.

[21] Appl. No.: 676,035

[22] Filed: Mar. 27, 1991

[51] Int. Cl.[5] .............................................. G01L 7/00
[52] U.S. Cl. ............................................ 73/706; 73/756
[58] Field of Search ................. 73/706, 720, 754, 753, 73/723, DIG. 4, 756; 310/338

[56] References Cited

U.S. PATENT DOCUMENTS

| | | | |
|---|---|---|---|
| 2,569,987 | 10/1951 | Frondel | 73/DIG. 4 |
| 3,024,649 | 3/1962 | Taber | 73/141 |
| 3,521,492 | 7/1970 | Baltakis | 73/754 |
| 3,706,953 | 12/1972 | Kicks et al. | 338/4 |
| 4,073,193 | 2/1978 | Mastandrea | 73/DIG. 4 |
| 4,367,651 | 1/1983 | Cameron et al. | 73/706 |
| 4,686,764 | 8/1987 | Adams et al. | 29/592 |

Primary Examiner—Donald O. Woodiel
Attorney, Agent, or Firm—William Stepanishen; Donald J. Singer

[57] ABSTRACT

A pressure transducer apparatus having a flexible shock absorber in direct contact with the sensing element of a pressure transducer to prevent the direct application of harmful external environmental elements. A metal disk is located on the top of the shock absorber to provide mass for absorbing particle momentum. An air gap surrounding the shock absorber provides space for radial expansion of the shock absorber.

11 Claims, 1 Drawing Sheet

PRESSURE TRANSDUCER PROTECTION APPARATUS

STATEMENT OF GOVERNMENT INTEREST

This invention described herein may be manufactured and used by or for the Government for governmental purposes without the payment of any royalty thereon.

BACKGROUND OF THE INVENTION

The present invention relates generally to a pressure transducer apparatus and, more particularly, to a pressure transducer protection apparatus for severe environments.

The state of the art of pressure transducer protection apparatus is well represented and alleviated to some degree by the prior art apparatus and approaches which are contained in the following U.S. Patents:

U.S. Pat. No. 3,024,649 issued to Taber on Mar. 13, 1962;

U.S. Pat. No. 3,706,953 issued to Kicks et al on Dec. 19, 1972; and

U.S. Pat. No. 4,686,746 issued to Adams et al on Aug. 18, 1987.

The Taber patent is directed to a force measuring instrument having a flexible fluid and vapor barrier for transmitting force to means sensitive to force and variations thereof. The instrument has pressure sensitive potions formed to engage and support the central portion of the barrier while the barrier has a bead section connecting the central section to the marginal portion.

The Kicks et al patent discusses a protected pressure transducer having such a flexible diaphragm as the pressure sensing means, the diaphragm is mounted within a tubular housing which incorporates a protector plate fitted across the entire cross-sectional area of the tubular housing and it is formed with a plurality of holes near its circumference with all these holes being radially spaced beyond the circumference of the diaphragm to direct the fluid stream, possibly carrying particles, to energy absorbing structure located radially beyond the circumference of the diaphragm.

The Adams et al patent describes a solid state semiconductor pressure sensor in which the pressure sensor element is protected from the ambient whose pressure is being measured by a combination of a pressure transfer medium and a thin covering membrane. A method is described for applying the thin covering membrane so as to substantially avoid entrapment of air or formation of voids in the pressure transfer medium which would degrade the performance of the sensor. The pressure transfer medium is gel-like material such as a silastic.

The problem solved was to measure air loads plus dust loads in transient dusty flow behind a simulated nuclear air blast. The gauge design requirements were to survive for more than 100 milliseconds in a dusty flow environment that included particle sizes up to 1 mm and particle velocities up to 2200 fps. The design pressure range was 150 psig nominal with pressure spikes up to 300 psig resolution. The accuracy goal was 3 psi at pressure levels from 0 to 50 psig. The response goal was to fully respond to pressure changes within one millisecond. The gauges had to be small enough to be easily installed in subscale models. The exposed material subjected to the environment had to be similar to the model surface so that the dust interaction with the surface was similar. Gauges produced generally exceeded design requirements and goals.

While this concept was developed for a specific application, it could be used in other erosive, corrosive or high temperature environments where high frequency measurements are to be made.

Prior attempts to measure dust and air loads were marginally successful at best. The use of pressure transducers without protection usually resulted in gauge destruction before the desired data were obtained. Protection devices often caused interference and non-linear effects, which produced erroneous results. Also, those gauges often had baseline (zero) shifts and drifts that were larger than desired measurements. Larger mechanical devices generally had slow response, were cumbersome from the standpoint of installing in models, and required considerable analysis and interpretation of the results, which were generally still open to question.

While the above-cited references are instructive, there still remains a need to provide a pressure transducer protective apparatus for operation in severe and harsh environments. The present invention is intended to satisfy that need.

SUMMARY OF THE INVENTION

The present invention utilizes a flexible shock-absorbing material which is dimensioned to and in contact with the sensing element of a pressure transducer. A metal disk which has a diameter equal to the flexible material, covers and protects the flexible shock-absorbing material from direct contact with external forces and elements. A stepped sleeve may be fastened to the pressure transducer to surround the metal disk and the shock-absorbing material and, to provide a radial expansion gap for the shock-absorbing material.

It is one object of the present invention, therefore, to provide an improved pressure transducer protection apparatus.

It is another object of the invention to provide an improved pressure transducer protection apparatus wherein external forces and elements are prevented from contacting the sensing element.

It is still another object of the invention to provide an improved pressure transducer protection apparatus wherein impact energy is absorbed evenly to distribute the load on the sensing element.

It is yet another object of the invention to provide an improved pressure transducer protection apparatus wherein external particles cannot directly impinge upon the sensing element.

It is still a further object of the invention to provide an improved pressure transducer protection apparatus wherein mass is provided to absorb particle momentum.

These and other advantages, objects and features of the invention will become more apparent after considering the following description taken in conjunction with the illustrative embodiment in the accompanying drawings.

DETAILED DESCRIPTION OF THE PREFERRED EMBODIMENT

Figure 1:
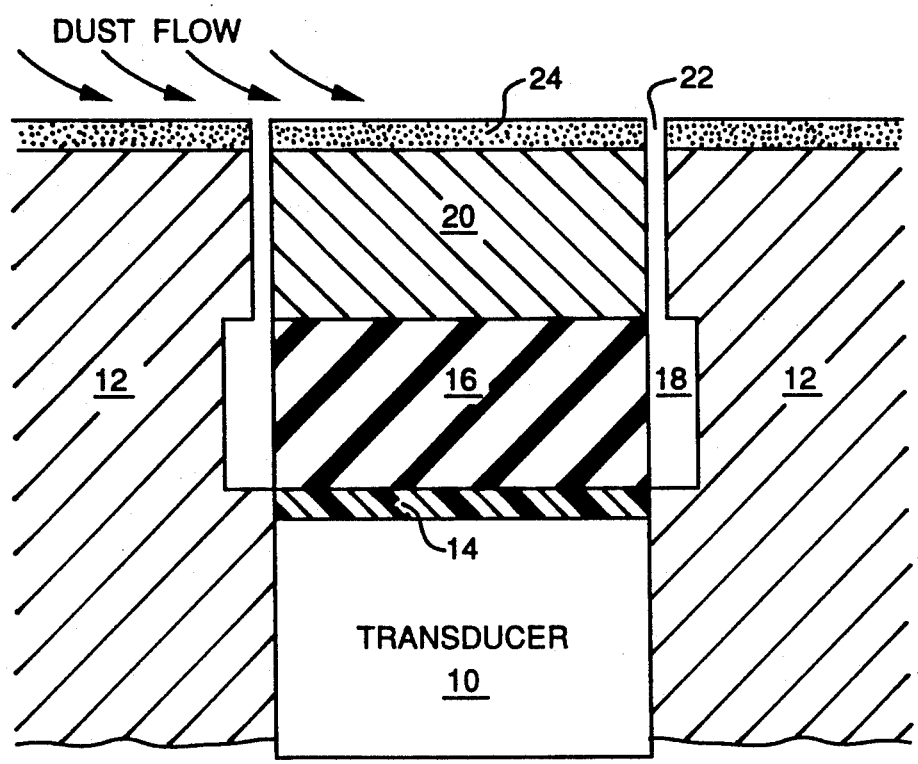
FIG. 1 is a schematic diagram of the pressure transducer protection apparatus according to the present invention.

Referring now to FIG. 1, there is shown a schematic representation of the pressure transducer apparatus wherein a typical pressure transducer 10 is placed in a surrounding medium or material 12. The area in which the pressure transducer 10 and the surrounding material 12 are located, will be subjected to an open air blast that will be measured by the pressure transducer 10. The sensing element 14 of the pressure transducer 10 is not subjected to the direct blast conditions or to the severe environment effects that may be generated by such blast. A shock absorber structure 16 which is comprised of a flexible material, such as neoprene or some other similar type material, is in direct contact with the sensing element 14. The flexible shock absorber material 16 distributes any applied load evenly to sensing element 14 and provides a cushion to absorb energy from impacts. An air gap 18 is provided around the entire outer periphery of shock absorber structure 16. The air gap provides sufficient space to allow the radial expansion of the flexible shock absorber material 16. A metal disk 20 is positioned directly atop the flexible shock absorber material 16. The metal disk 20 prevents particles from direct impingement on the sensing element 14 and also, provides mass for absorbing particle momentum. A slight clearance space 22 is provided between the metal disk 20 and the surrounding material 12. This clearance space 22 may be filled with a lubricant such as vacuum grease to seal this area sufficiently to prevent the entrance of contaminants or other particles and pollutants. This lubricant serves as a further barrier to foreign matter and thereby prevents direct impingement of these elements upon the sensing element 14. A coating 24 may be utilized to cover the metal disk 20. This coating, if used, may comprise an element or material that matches the surrounding surface. It should be noted that the diameters of the metal disk 20, the flexible material 16 and the sensing element 14 are equal. The dust flow which results from an air blast is as shown in FIG. 1.

Figure 2:
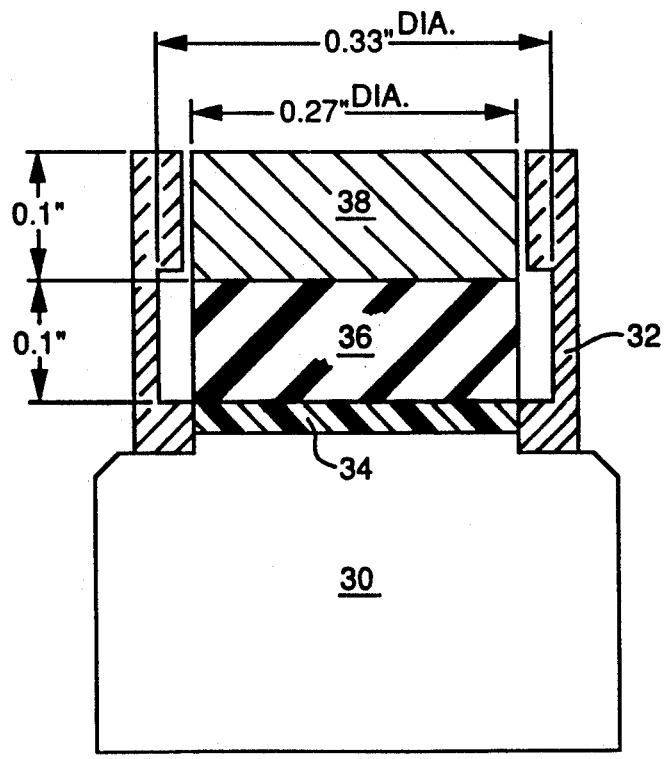
FIG. 2 is a partial section view of the pressure transducer protection apparatus.

Turning now to FIG. 2, there is shown a pressure transducer 30 which has been slightly modified to accept the pressure transducer protection apparatus. A stepped collar or sleeve 32 has been mounted and fastened to the pressure transducer 30. The stepped sleeve 32 may be attached to the pressure transducer 30 by any suitable commercially-available means such as welding, brazing, bonding etc. In this example, a neoprene disk 36 which comprises the shock absorber material, is positioned directly upon the sensing element 34. The neoprene disk 36 is also radially aligned with the expansion air gap 38 which comprises a portion of the stepped sleeve 32. An aluminum disk 38 is positioned in direct contact with the neoprene disk 36. The aluminum disk 38 and the neoprene disk 36 are both contained within the stepped sleeve 32. The dimensions of the various elements in this example are typical for a protection apparatus for a modified HKM-375 pressure transducer.

Although the invention has been described with reference to a particular embodiment, it will be understood to those skilled in the art that the invention is capable of a variety of alternative embodiments within the spirit and scope of the appended claims.

What is claimed is:

1. A pressure transducer protection apparatus, said pressure transducer protection apparatus being embedded in a surrounding material, and comprising in combination:
    a pressure transducer including a sensing element to receive an input pressure,
    load distribution means said load distribution means distributing the load from said input pressure evenly to said sensing element, said load distribution means provides a cushion to absorb energy due to external impacts,
    a disk is operatively positioned atop said load distribution means, said disk prevents external particles from directly impinging on said sensing element and also provides mass for absorbing the momentum of said external particles,
    an air gap formed in said surrounding material and located around the outer periphery of said load distribution means, said air gap provides a radial expansion space for said load distribution means, and
    a clearance gap provided between the outer periphery of said disk and said surrounding material.

2. A pressure transducer protection apparatus as described in claim 1 wherein said pressure transducer protection apparatus further includes a coating which covers said disk and matches the surface of said surrounding material.

3. A pressure transducer protection apparatus as described in claim 1 wherein the diameter of said disk, said load distribution means and (said sensing element) are equal.

4. A pressure transducer protection apparatus as described in claim 1 wherein said load distribution means comprises a flexible material.

5. A pressure transducer protection apparatus as described in claim 4 wherein said flexible material comprises a neoprene disk.

6. A pressure transducer protection apparatus as defined in claim 1 wherein said disk is made of metal.

7. A pressure transducer protection apparatus as described in claim 6 wherein said metal disk comprises aluminum.

8. A pressure transducer protection apparatus as described in claim 6 wherein said load distribution means and said metal disk are equal in size and shape.

9. A pressure transducer protection apparatus as described in claim 1 wherein said clearance gap contains a lubricant therein.

10. A pressure transducer protection apparatus as described in claim 9 wherein said lubricant comprises vacuum grease.

11. A pressure transducer protection apparatus comprising in combination:
    a pressure transducer including a sensing element to receive an input pressure,
    load distribution means, said load distribution means distributing the load from said input pressure evenly to said sensing element, said load distribution means provides a cushion to absorb energy due to external impacts,
    a disk is operatively positioned atop said load distribution means, said disk prevents external particles from directly impinging on said sensing element and also provides means for absorbing the momentum of said external particles, and
    said pressure transducer further includes a stepped sleeve operatively fastened thereto, said stepped sleeve provides a radial expansion chamber for said load distribution means.

* * * * *